US009913119B2

(12) United States Patent
Kodama

(10) Patent No.: US 9,913,119 B2
(45) Date of Patent: Mar. 6, 2018

(54) INFORMATION PROCESSING APPARATUS, INFORMATION PROCESSING METHOD, AND STORAGE MEDIUM

(71) Applicant: SONY CORPORATION, Tokyo (JP)

(72) Inventor: Kenichiro Kodama, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/038,962

(22) PCT Filed: Nov. 26, 2014

(86) PCT No.: PCT/JP2014/081236
§ 371 (c)(1),
(2) Date: May 24, 2016

(87) PCT Pub. No.: WO2015/118753
PCT Pub. Date: Aug. 13, 2015

(65) Prior Publication Data
US 2017/0164172 A1    Jun. 8, 2017

(30) Foreign Application Priority Data
Feb. 6, 2014    (JP) ................................. 2014-021478

(51) Int. Cl.
H04W 4/20    (2009.01)
H04W 4/02    (2018.01)
H04W 4/00    (2018.01)

(52) U.S. Cl.
CPC .......... *H04W 4/206* (2013.01); *H04W 4/008* (2013.01); *H04W 4/023* (2013.01); *H04M 2250/02* (2013.01)

(58) Field of Classification Search
CPC ..... H04W 4/206; H04W 4/008; H04W 4/023; H04M 2250/02
See application file for complete search history.

(56) References Cited

U.S. PATENT DOCUMENTS 8,825,647 B2    9/2014 Yamada et al.
8,996,313 B2    3/2015 Kamiwada
(Continued)

FOREIGN PATENT DOCUMENTS

JP    2008-5228 A    1/2008
JP    2009-33252 A    2/2009
(Continued)

OTHER PUBLICATIONS

International Search Report dated Feb. 17, 2015, in PCT/JP2014/081236 filed Nov. 26, 2014.

Primary Examiner — Nathan Mitchell
(74) Attorney, Agent, or Firm — Oblon, McClelland, Maier & Neustadt, L.L.P.

(57) ABSTRACT

To propose an information processing apparatus, information processing method and storage medium which enable acquisition of information useful for estimation of realistic human relationship.
[Solution] An information processing apparatus includes: a communication unit configured to be able to communicate with another information processing apparatus by using a plurality of communication schemes; and a control unit configured to, when communication with the another information processing apparatus is successful, store in a storage medium a log in which identification information corresponding to the another information processing apparatus acquired from the another information processing apparatus through the communication unit and communication scheme information indicating a communication scheme with which the communication is successful are associated with each other.

13 Claims, 11 Drawing Sheets

(56) References Cited

U.S. PATENT DOCUMENTS

| | | | | |
|---|---|---|---|---|
| 2004/0209639 | A1* | 10/2004 | Kamperschroer | H04W 40/246 455/522 |
| 2006/0198305 | A1* | 9/2006 | Hamdi | H04L 41/12 370/232 |
| 2007/0178852 | A1* | 8/2007 | Young | G06F 1/1616 455/90.3 |
| 2009/0047988 | A1* | 2/2009 | Kanda | H04W 52/50 455/522 |
| 2010/0233975 | A1* | 9/2010 | Wu | H04W 52/52 455/115.1 |
| 2011/0286340 | A1* | 11/2011 | Janecek | H04L 1/0036 370/252 |
| 2013/0215828 | A1* | 8/2013 | Hodroj | H04W 28/02 370/328 |
| 2014/0160947 | A1* | 6/2014 | Du | H04B 7/0452 370/252 |
| 2015/0181458 | A1* | 6/2015 | Aryafar | H04W 28/0252 370/230 |
| 2015/0200846 | A1* | 7/2015 | Hui | H04L 45/70 370/253 |
| 2016/0142177 | A1* | 5/2016 | Chou | H04L 1/0005 370/329 |
| 2016/0204879 | A1* | 7/2016 | Niewczas | H04B 11/00 455/41.1 |

FOREIGN PATENT DOCUMENTS

| | | |
|---|---|---|
| JP | 2009-141928 A | 6/2009 |
| JP | 2012-52922 A | 3/2012 |
| JP | 2012-216984 A | 11/2012 |

* cited by examiner

FIG. 2
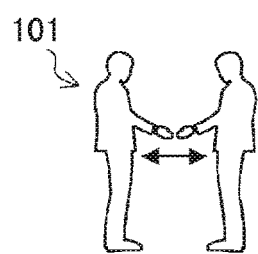
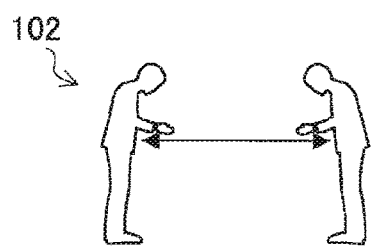
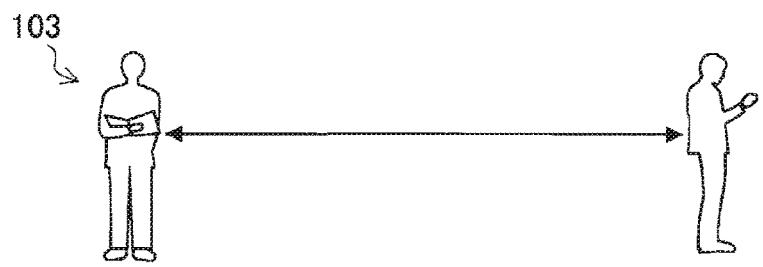
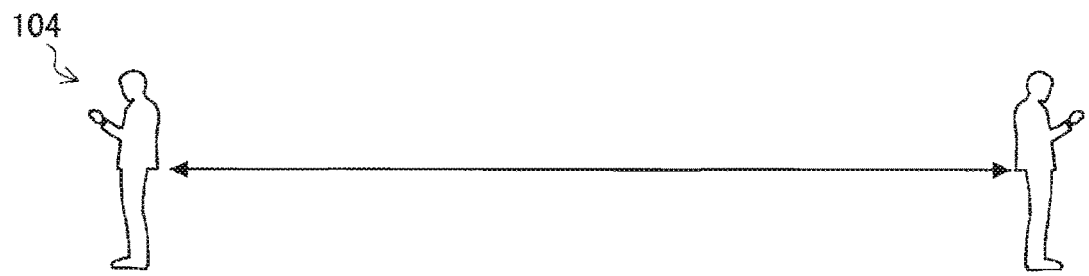

INFORMATION PROCESSING APPARATUS, INFORMATION PROCESSING METHOD, AND STORAGE MEDIUM

TECHNICAL FIELD

The present disclosure relates to an information processing apparatus, an information processing method, and a storage medium.

BACKGROUND ART

In recent years, web service called social networking service (SNS) which enables communication according to human relationship such as friends, family members and colleagues becomes popular. Human relationship between humans in SNS is expressed as a social graph in which a human is expressed as a node and linkage is expressed as an edge. In recent years, attention is focused on the social graph as information useful for, for example, marketing.

CITATION LIST

Patent Literature

Patent Literature 1: JP 2009-141928A

SUMMARY OF INVENTION

Technical Problem

However, a typical social graph expresses human relationship peculiar on the web, and there is a case where the human relationship expressed in the social graph is different from actual human relationship. For example, there is a case where humans living physically close to each other do not have linkage on the social graph. It should be noted that, as a method for measuring a physical distance, a technique of estimating a distance from a counterpart apparatus based on electric field intensity of a received radio signal is disclosed in, for example, the above-described Patent Literature 1. Therefore, the present disclosure proposes a new and improved information processing apparatus, information processing method and storage medium which enable acquisition of information useful for estimation of realistic human relationship.

Solution to Problem

According to the present disclosure, there is provided an information processing apparatus including: a communication unit configured to be able to communicate with another information processing apparatus by using a plurality of communication schemes; and a control unit configured to, when communication with the another information processing apparatus is successful, store in a storage medium a log in which identification information corresponding to the another information processing apparatus acquired from the another information processing apparatus through the communication unit and communication scheme information indicating a communication scheme with which the communication is successful are associated with each other.

According to the present disclosure, there is provided an information processing apparatus including: a communication unit configured to receive from a client apparatus capable of communicating with another client apparatus by using a plurality of communication schemes, identification information corresponding to the another client apparatus which succeeds in communication and communication scheme information indicating a communication scheme with which the communication is successful; and a control unit configured to store in a storage medium a log in which the identification information and the communication scheme information received through the communication unit are associated with each other.

According to the present disclosure, there is provided a storage medium storing a program for making a computer function as an information processing apparatus including: a communication unit configured to be able to communicate with another information processing apparatus by using a plurality of communication schemes; and a control unit configured to, when communication with the another information processing apparatus is successful, store in a storage medium a log in which identification information corresponding to the another information processing apparatus acquired from the another information processing apparatus through the communication unit and communication scheme information indicating a communication scheme with which the communication is successful are associated with each other.

According to the present disclosure, there is provided an information processing method including: receiving from a client apparatus capable of communicating with another client apparatus by using a plurality of communication schemes, identification information corresponding to the another client apparatus which succeeds in communication and communication scheme information indicating a communication scheme with which the communication is successful; and storing in a storage medium a log in which the received identification information and communication scheme information are associated with each other.

Advantageous Effects of Invention

According to the present disclosure as described above, it is possible to acquire information useful for estimation of realistic human relationship. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 2 is an explanatory diagram for explaining a method for estimating a distance between users based on a communication scheme according to an embodiment of the present disclosure.

DESCRIPTION OF EMBODIMENTS

Hereinafter, preferred embodiments of the present disclosure will be described in detail with reference to the appended drawings. In this specification and the drawings, elements that have substantially the same function and structure are denoted with the same reference signs, and repeated explanation is omitted.

It should be noted that description will be provided in the following order.
1. Overall Configuration.
2. First Embodiment
2-1. Configuration Example of Smart Watch
2-2. Operation Processing
2-3. Modified Example 1
2-4. Modified Example 2
3. Second Embodiment
3-1. Outline
3-2. Operation Processing
4. Conclusion

1. OVERALL CONFIGURATION

First, an overall configuration of a distance measurement system according to an embodiment of the present disclosure will be described with reference to FIG. 1 and FIG. 2.

Figure 1:
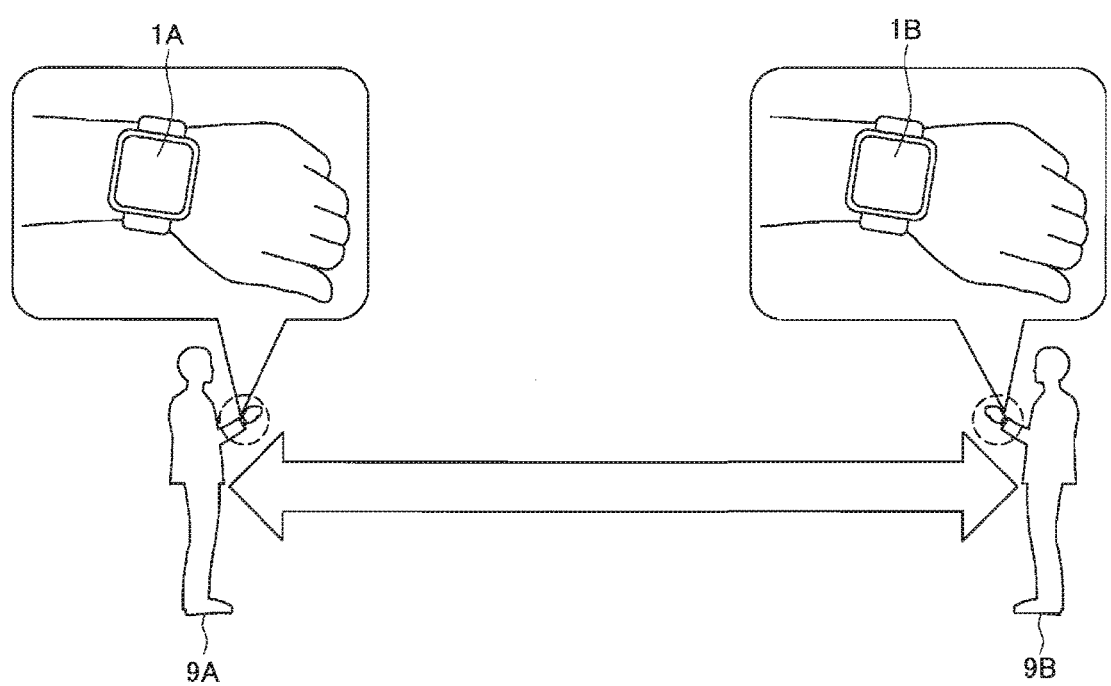
FIG. 1 is an explanatory diagram for explaining an overall configuration of a distance measurement system according to an embodiment of the present disclosure.

FIG. 1 is an explanatory diagram for explaining an overall configuration of a distance measurement system according to an embodiment of the present disclosure. As illustrated in FIG. 1, a user 9A wears a smart watch 1A, and a user 9B wears a smart watch 1B. The distance measurement system according to the present embodiment includes, for example, the smart watches 1A and 1B. The smart watch 1A and the smart watch 1B can communicate with each other using a plurality of communication schemes. The plurality of communication schemes include, for example, known radio communication standards such as Bluetooth® and WiFi®. The smart watch 1A tries to communicate with the smart watch 1B sequentially using the plurality of communication schemes and records a communication scheme with which communication is successful as a log. It should be noted that, in the log, recording time and identification information corresponding to the smart watch 1B can be recorded together.

In the communication schemes, communication possible distances different from each other are respectively defined. Therefore, a distance between the smart watches 1A and 1B can be estimated based on with which of the communication schemes communication is failed, and with which of the communication schemes communication is successful. Accordingly, the smart watch 1A can estimate a physical distance between the users 9A and 9B by referring to the log.

Here, a method for estimating a distance between users based on a communication scheme will be described with reference to FIG. 2.

FIG. 2 is an explanatory diagram for explaining a method for estimating a distance between users based on a communication scheme. For example, when communication is successful using a communication scheme in which the communication possible distance is a short distance, as indicated with a reference numeral 101 in FIG. 2, it is estimated that a distance between the users is a short distance. Further, when communication is successful using a communication scheme in which the communication possible distance is a medium distance and communication is failed using a communication scheme in which the communication possible distance is a short distance, as indicated with a reference numeral 102, it is estimated that the distance between the users is a medium distance. In a similar manner, when communication is successful using a communication scheme in which the communication possible distance is a long distance and communication is failed using a communication scheme in which the communication possible distance is a medium distance, as indicated with a reference numeral 103, it is estimated that the distance between the users is a long distance. Further, when communication is failed using a communication scheme in which the communication possible distance is a long distance, as indicated with a reference numeral 104, it is estimated that the distance between the users is a super long distance.

The smart watch 1A can estimate human relationship between the users based on the estimation result of the distance between the users 9A and 9B. For example, when the user 9A often stays in close to the user 9B, and when the user 9A stays in close to the user 9B for a long period, the smart watch 1A estimates that the users 9A and 9B have close human relationship. On the other hand, when the user 9A scarcely stays in close to the user 9B, and when the user 9A stays in close to the user 9B for a short period, the smart watch 1A estimates that the users 9A and 9B have shallow human relationship. In this manner, a log in which a communication scheme with which communication is successful is recorded can be used for estimation of a distance between users, and is useful for estimation of realistic human relationship.

While, in the above description, an example where the smart watch 1A records a log, estimates a distance and estimates human relationship has been described, the smart watch 1B can also perform the same processing. Further, for example, a server which is not illustrated may estimate a distance and estimate human relationship with reference to a log. It should be noted that, in the following description, when it is not necessary to particularly distinguish between the smart watches 1A and 1B, the smart watches 1A and 1B are collectively referred to as a smart watch 1. The same also applies to the users 9A and 9B.

Further, while FIG. 1 illustrates an example where the information processing apparatus according to an embodiment of the present disclosure is implemented as the smart watch 1, a technique according to the present disclosure is not limited to this. For example, the information processing apparatus may be implemented as a wearable device such as a head mounted display (HMD) and a wristband type apparatus. In addition, the information processing apparatus may be a digital camera, a digital video camera, a tablet terminal, a mobile phone terminal, a notebook personal computer (PC), or the like.

The overall configuration of the distance measurement system according to the present embodiment has been described above. Details of each embodiment will be described below.

2. FIRST EMBODIMENT

The present embodiment is an embodiment in which respective classes of Bluetooth are employed as a plurality of communication schemes. First, a configuration example of the smart watch 1 according to the present embodiment will be described with reference to FIG. 3 and FIG. 4.

2-1. Configuration Example of Smart Watch

Figure 3:
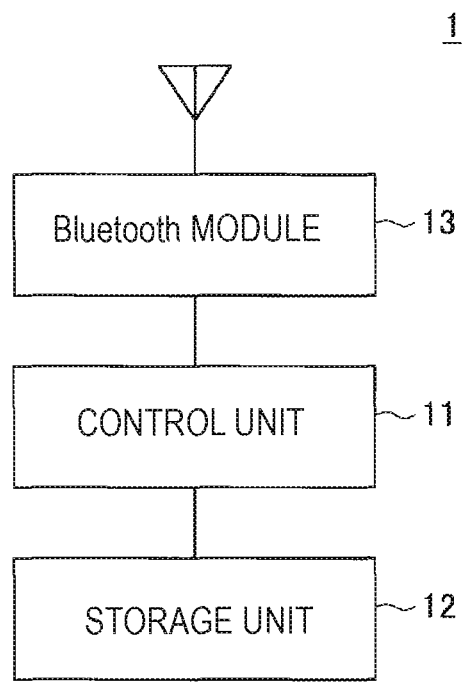
FIG. 3 is a block diagram illustrating a configuration example of a smart watch according to a first embodiment.

FIG. 3 is a block diagram illustrating a configuration example of the smart watch 1 according to the first embodiment. As illustrated in FIG. 3, the smart watch 1 has a control unit 11, a storage unit 12 and a Bluetooth module 13. In the following description, another smart watch 1 communicating with the smart watch 1 will be also referred to as a counterpart apparatus. The counterpart apparatus has the same function as the function of the smart watch 1, and vice versa.

(1) Bluetooth Module 13

The Bluetooth module 13 is a communication module for transmitting and receiving data to and from another information processing apparatus using Bluetooth. Particularly, the Bluetooth module 13 according to the present embodiment functions as a communication unit which can communicate with another smart watch 1 using a plurality of communication schemes. Here, the plurality of communication schemes include class 1, class and class 3 of Bluetooth. The Bluetooth module 13 switches the communication scheme among class 1, class 2 and class 3 using transmission power control (TPC). The following Table 1 indicates transmission power and a communication possible distance for each class.

TABLE 1

|  | Communication possible distance (rough indication) | Transmission power |
|---|---|---|
| Class 1 | 0 to 100 m | +4 to +20 dBm |
| Class 2 | 0 to 10 m | −6 to +4 dBm |
| Class 3 | 0 to 1 m | 0 dBm (max) |

It should be noted that a unit of the communication possible distance in Table 1 is meter (m), and a unit of the transmission power is decibel mili (dBm: 0 dB=1 mW).

The Bluetooth module 13 transmits a transmission signal sequentially using a communication scheme with a shorter communication possible distance. Specifically, the Bluetooth module 13 transmits a transmission signal using a communication scheme in order of class 3, class 2 and class 1, and repeats transmission sequentially using a communication scheme in order of class 3, class 2 and class 1 thereafter. The Bluetooth module 13 transmits a transmission signal, for example, at transmission power of 0 dBM in class 3, at transmission power of +1 dBm to +4 dBm in class 2 and at transmission power of +5 dBm to +20 dBm in class 1.

The Bluetooth module 13 receives a response from a counterpart apparatus which succeeds in receiving the transmission signal. Here, that the Bluetooth module 13 receives from the counterpart apparatus, the response indicating that the counterpart apparatus succeeds in receiving the transmission signal transmitted from the Bluetooth module 13 will be hereinafter also referred to as "communication is successful". Transmission and reception through the Bluetooth module 13 may be in, for example, search process before pairing (connection). In this case, the smart watch 1 can estimate a distance from the counterpart apparatus without being paired. Information transmitted through the Bluetooth module 13 as the transmission signal and information sent back from the counterpart apparatus will be described in detail later.

Here, in the technique disclosed in the above-described Patent Literature 1, a distance between a receiving unit (of the own apparatus) and a transmitting unit (of the counterpart apparatus) is estimated based on a reception level (electric field intensity) of WiFi. However, the WiFi module is more expensive than the Bluetooth module. Further, because the WiFi module is typically larger than the Bluetooth module and requires a larger capacity battery because transmission power of WiFi is larger, a terminal can be larger to secure space for providing the WiFi module and the large capacity battery. Regarding this point, because the Bluetooth module is small and requires a small battery because transmission power is small, as a module to be mounted on a small wearable device, the Bluetooth module is more preferable.

(2) Storage Unit 12

The storage unit 12 is a portion which records and reproduces data with respect to a predetermined storage medium based on control by the control unit 11 which will be described later. The storage unit 12 is realized as, for example, a hard disc drive (HDD). Of course, a recording medium can include various types of recording media such as a solid-state memory such as a flash memory, a memory card which incorporates a solid-state memory, an optical disc, a magnetooptical disc, and a hologram memory, and the storage unit 12 only has to employ a configuration which enables execution of recording and reproduction according to the recording medium to be employed. Such a storage medium may be provided at the smart watch 1, or provided at an external apparatus which can perform communication through the Bluetooth module 13 or using other communication standards such as a wireless local area network (LAN).

(3) Control Unit 11

The control unit 11 which functions as an arithmetic processing unit and a control apparatus, controls the whole operation within the smart watch 1 according to various kinds of programs. The control unit 11 is implemented by, for example, a central processing unit (CPU) and a microprocessor. It should be noted that the control unit 11 may include a read only memory (ROM) in which a program, an operation parameter, or the like, to be used is stored, and a random access memory (RAM) in which a parameter, or the like, which changes as appropriate is temporarily stored. The control unit 11 according to the present embodiment has a function of recording a log and a function of estimating human relationship based on the log.

(3-1, Function of Recording Log)

The control unit 11 according to the present embodiment as a function of controlling the storage unit 12 so as to store a communication result as a log in a storage medium when communication with another smart watch 1 is successful through the Bluetooth module 13. The control unit 11 stores identification information corresponding to the counterpart apparatus acquired from the counterpart apparatus through the Bluetooth module 13 and communication scheme information indicating a communication scheme with which communication is successful in association with each other as a log. The identification information may be, for example, a terminal ID for identifying the counterpart apparatus, or may be a user ID for identifying a user who wears the counterpart apparatus. In the following description, description will be provided assuming that the identification information is a user ID of a user who wears the counterpart apparatus.

Here, a method for acquiring a user ID from the counterpart apparatus which succeeds in communication will be described. The control unit 11 transmits a transmission signal through the Bluetooth module 13, and the counterpart apparatus which succeeds in receiving this transmission signal provides a response indicating that reception is successful. Because the counterpart apparatus provides a response signal in which a user ID of a user who wears the counterpart apparatus is stored, the control unit 11 can acquire the user ID from the counterpart apparatus. It should be noted that the control unit 11 may store in the transmission signal, arbitrary identification information for distinguishing the transmission signal from a transmission signal from another smart watch 1. When the counterpart apparatus stores this arbitrary identification information in the response signal, the control unit 11 can identify whether or not the response is a response to the transmission signal transmitted by the own apparatus according to whether or not identical identification information is stored. It should be noted that this arbitrary identification information may be a terminal ID, a user ID, an arbitrary hash value, a random character string, information indicating transmission time, or the like.

The control unit 11 may further store date and time at which communication is successful in association with the information. It should be noted that when a log is stored in an external apparatus, date and tune at which the external apparatus receives the communication result or storage date and time may be stored in place of date and time at which communication is successful. An example of the log will be indicated below.

(Example of Log)
2014/2/2/10:00:00; Class3; ID_UserB
2014/2/2/10:00:01; Class2; ID_UserB, ID_UserC
2014/2/2/10:00:02; Class1; ID_UserB, ID_UserC, ID_UserD
2014/2/2/10:01:00; Class3; ID_UserB
2014/2/2/10:01:01; Class2; ID_UserB, ID_UserC
2014/2/2/10:01:02; Class1; ID_UserB, ID_UserC, ID_UserD In the above-described log, the date and time at which communication is successful, the communication scheme information, and the user ID of the user who wears the counterpart apparatus are stored in association with each other. It should be noted that Class 3 indicates communication scheme information indicating class 3, Class 2 indicates communication scheme information indicating class 2, and Class 1 indicates communication scheme information indicating class 1. Further, it is assumed that ID_UserB indicates a user ID of the user B, ID_UserC indicates a user ID of the user C, and ID_UserD is a user ID of the user D.

(3-2) Function of Estimating Human Relationship

The control unit 11 has a function of estimating relationship between the user of the smart watch 1 and the user of the counterpart apparatus based on a communication possible distance of a communication scheme indicated by the communication scheme information stored in the log in association with the identification information corresponding to the counterpart apparatus. As indicated in Table 1, communication possible distances are different among the respective classes of Bluetooth. Therefore, the control unit 11 can estimate a distance between the users based on a class with which communication is successful recorded in the log.

For example, in the above-described example of the log, at time 10:00, a user ID of the user B is recorded in all classes of class 3, class 2 and class 1. That is, communication is successful using class 3 in which the communication possible distance is a short distance. Therefore, as indicated with a reference numeral 101 in FIG. 2, the control unit 11 estimates that a distance from the user B at time 10:00 is a short distance (0 to 1 meter). For example, when the user has a conversation with the user B on a one-to-one basis, the distance can be this short distance.

Further, at time 10:00, a user ID of the user C is recorded in class 2 and class 1. That is, communication is successful using class 2 in which the communication possible distance is a medium distance, and communication is failed using class 3 in which the communication possible distance is a short distance. Therefore, as indicated with a reference numeral 102 in FIG. 2, the control unit 11 estimates that a distance from the user C at time 10:00 is a medium distance 2 to 10 m). For example, when the user has a conversation with a group including the user B and other users, the distance can be this medium distance.

Further, at time 10:00, a user ID of the user D is recorded in class 1. That is, communication is successful using class 1 in which the communication possible distance is a long distance, and communication is failed using class 2 in which the communication possible distance is a medium distance. Therefore, as indicated with a reference numeral 103 in FIG. 2, the control unit 11 estimates that a distance from the user D at time 10:00 is a long distance (11 to 100 m). For example, when the user sits with the user B in a large meeting room, the distance can be this long distance.

Further, at time 10:00, a user ID of the user E is not recorded in any class. That is, communication is failed using class 1 in which the communication possible distance is a long distance. Therefore, as indicated with a reference numeral 104 in FIG. 2, the control unit 11 estimates that a distance from the user E at time 10:00 is a super long distance (longer than 101 meters).

Figure 4:
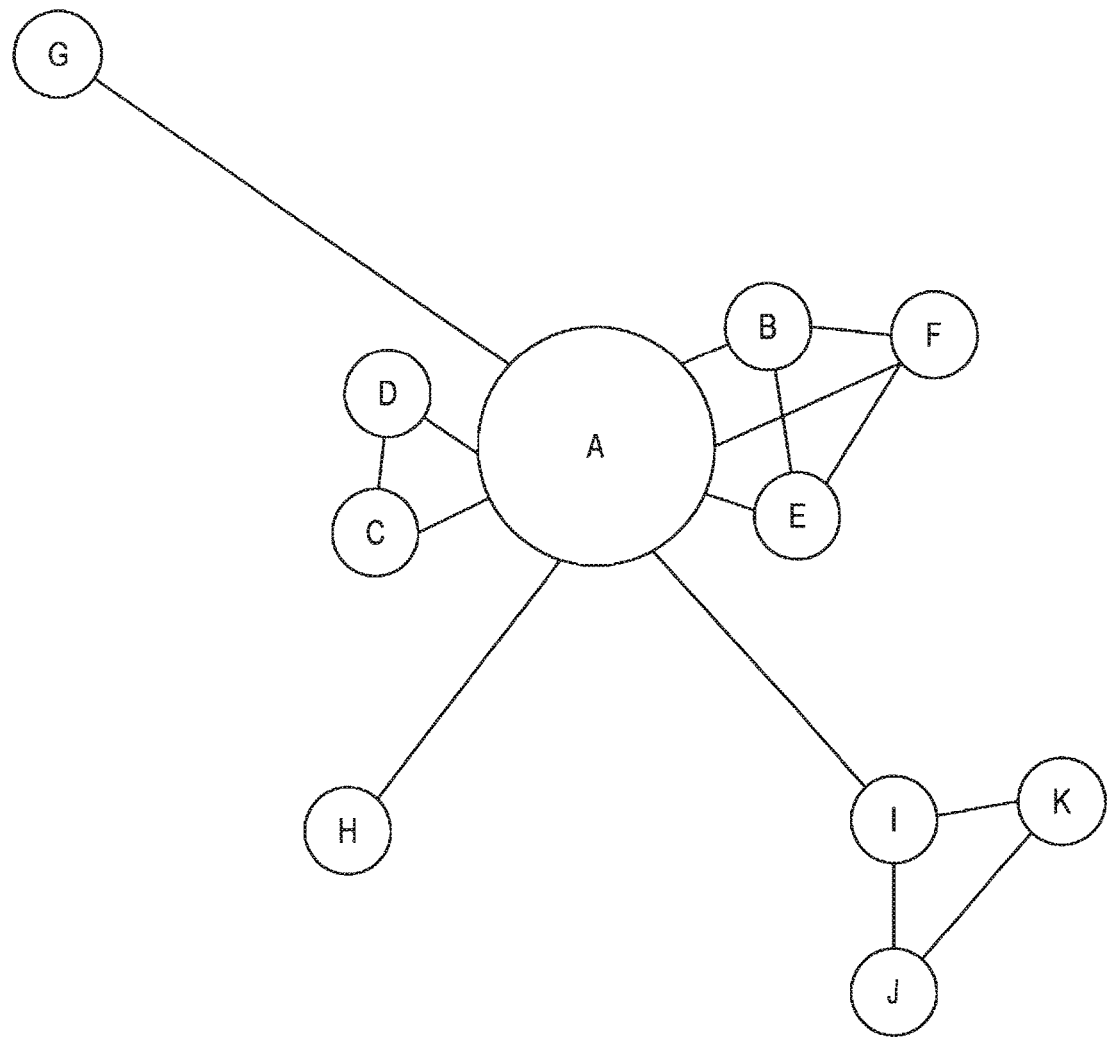
FIG. 4 is an example of a social graph generated by the smart watch according to the first embodiment.

The control unit 11 estimates relationship between the users based on the distance between the users estimated based on the communication possible distance of the communication scheme described above. For example, the control unit 11 estimates a degree of intimacy between the users based on the distance between the users, a period during which the users stay together in a short distance, the number of times the users stay in a short distance, or the like. The control unit 11 can generate, for example, a social graph as illustrated in FIG. 4, and can display the generated social graph in a display unit which is not illustrated. It should be noted that FIG. 4 is an example of the social graph generated by the smart watch 1 according to the present embodiment. In the social graph illustrated in FIG. 4, human relationship centering on the user A who wears the smart watch 1. For example, the user A has close human relationship with the user C and the user D, and has shallow human relationship with the user I, user J and user K.

The control unit 11 may estimate human relationship further based on position information or information such as a life cycle. For example, the control unit 11 can estimate whether a user having close human relationship is a colleague or a close friend or a family member, or the like, based on work hours, working location, a vacation period, a home position, or the like, of the user. In this manner, the control unit 11 can generate a social graph corresponding to realistic human relationship based on the log of the physical distance between the users.

(4) Supplement

The smart watch 1 may further include a microphone and a camera and record sound, an image (moving image/still image) as a log. In this case, the smart watch 1 can search sound of conversation and an image of a conversation partner when the user stays in a close distance with another user using, for example, time information, or the like. Of course, the smart watch 1 may perform search from, for example, another smart watch 1, a security camera, or the like. Further, the smart watch 1 may estimate relationship between the users more deeply according to content of an image and sound. For example, the smart watch 1 may estimate that closer human relationship is formed between the user and a user who has a conversation with the user than between the user and a user who simply stays in a short distance to the user.

Further, while, in the above description, an example has been described where the smart watch 1 has a function of recording a log and a function of estimating human relationship based on a log, the technique according to the present disclosure is not limited to this. For example, a server which is not illustrated may have at least one of the function of recording a log and the function of estimating human relationship based on a log. In this case, the smart watch 1 transmits a communication result through the Bluetooth module 13 to the server, and the server records a log and estimates human relationship.

The configuration of the smart watch 1 according to the present embodiment has been described above. Subsequently, operation processing of the distance measurement system will be described with reference to FIG. 5.

2-2. OPERATION PROCESSING

Figure 5:
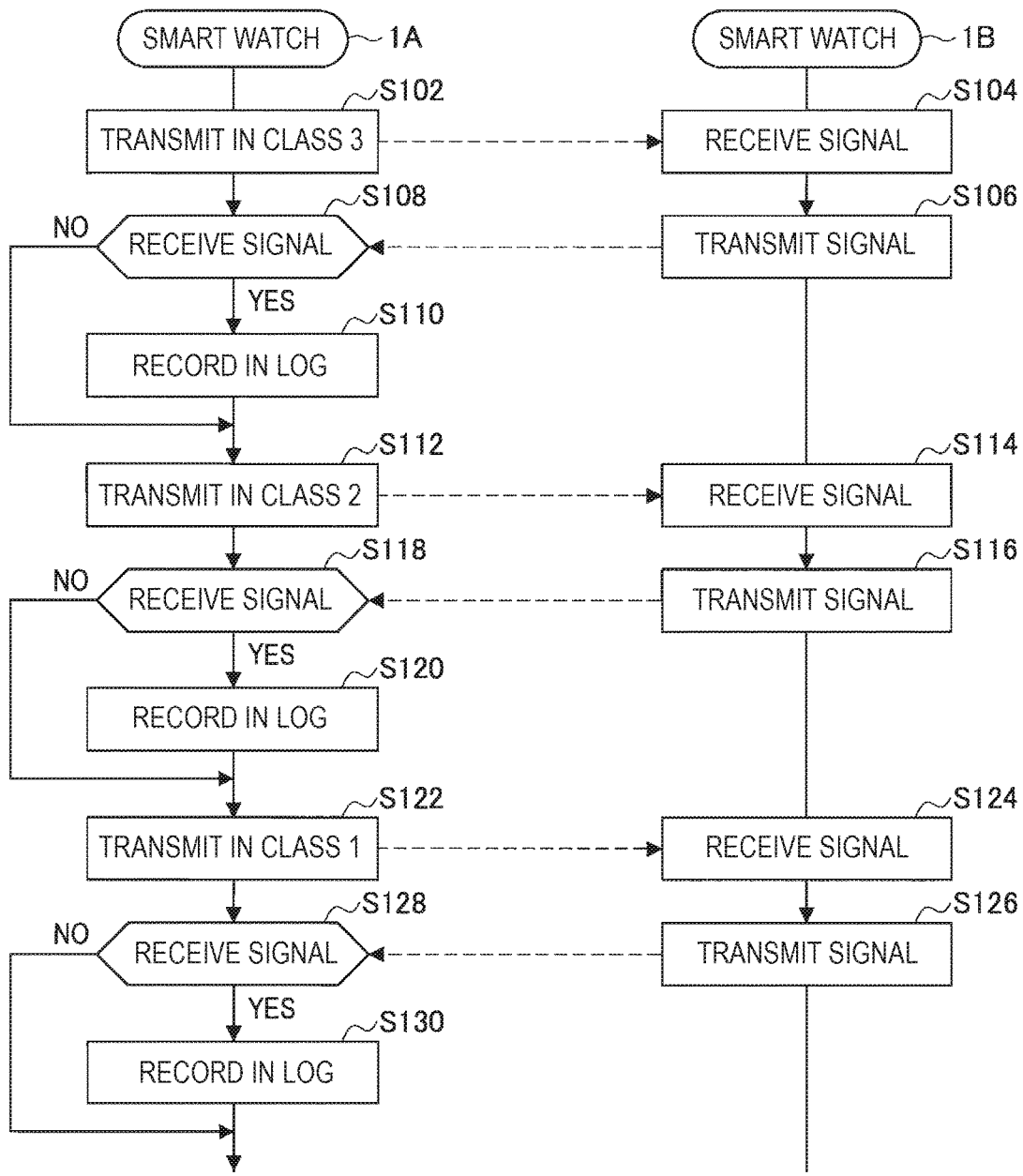
FIG. 5 is a sequence diagram illustrating an example of flow of processing of recording a log executed in a distance measurement system according to the first embodiment.

FIG. 5 is a sequence diagram illustrating an example of flow of processing of recording a log executed in the distance measurement system according to the present embodiment. The smart watch 1A and the smart watch 1B is involved with the sequence illustrated in FIG. 5. It should be noted that while one smart watch 1B is involved as an example of the counterpart apparatus in the following description, a plurality of smart watches 1 may be involved in a similar manner.

As illustrated in FIG. 5, first, in step S102, the smart watch 1A transmits a transmission signal in class 3. For example, the Bluetooth module 13 transmits a transmission signal at transmission power of 0 dBm.

When the smart watch 1B is located within one meter from the smart watch 1A, in step S104, the smart watch 1B receives a transmission signal transmitted from the smart watch 1A.

Then, in step S106, the smart watch 1B provides a response indicating that the smart watch 1B succeeds in receiving the transmission signal transmitted from the smart watch 1A. Specifically, e smart watch 1B transmits a response signal in which a user ID of the user B who wears the smart watch 1B is stored. At this time, the smart watch 1B may perform transmission using any of class 1 to class 3. For example, the smart watch 1B may perform transmission using class 1 with the longest communication possible distance. In this case, the smart watch 1B can make sure that the response signal reaches the smart watch 1A. Further, when the reception signal received in the above-described step S104 includes information indicating a class used for transmission by the smart watch 1A, the smart watch 1B may perform transmission using the class. In this case, the smart watch 1B can transmit a response signal using minimum transmission power enough to make a response reach the smart watch 1A.

Then, in step S108, the smart watch 1A deter mines whether or not a response to the transmission signal transmitted in the above-described step S102 is received. For example, when the smart watch 1B is located within one meter from the smart watch 1A, the smart watch 1A receives a response signal transmitted from the smart watch 1B in the above-described step S106. On the other hand, when the smart watch 1B is not located within one meter from the smart watch 1A, the smart watch 1A does not receive a response signal. It should be noted that the smart watch 1A may provide predetermined waiting time for receiving a response signal.

When a response signal is received (S108/Yes), in step S110, the smart watch 1A records a communication result in a log. More specifically, die control unit 11 records date and time at which communication is successful, communication scheme information indicating class 3 and a user ID of the user B who wears the smart watch 1B which is a source of the response signal in the log in association with each other. On the other hand, when a response signal is not received (S108/No), the processing proceeds to next processing without the log being recorded.

Subsequently, in step S112 to S120, the smart watch 1A performs the same processing as the processing in the above-described step S102 to S110 while switching the communication scheme to a communication scheme with a longer communication possible distance.

More specifically, first, in step S112, the smart watch 1A transmits a transmission signal in class 2. For example, the Bluetooth module 13 transmits a transmission signal at transmission power of ±1 dBm to +4 dBm. When the smart watch 1B is located within ten meters from the smart watch 1A, in step S114, the smart watch 1B receives the transmission signal transmitted from the smart watch 1A. Then, in step S116, the smart watch 1B provides a response indicating that the smart watch 1B succeeds in receiving the transmission signal transmitted from the smart watch 1A. Next, in step S118, the smart watch 1A determines whether or not a response to the transmission signal transmitted in the above-described step S112 is received. When a response signal is received (S118/Yes), in step S120, the smart watch 1A records a communication result in a log. On the other hand, when a response signal is not received (S118/No), the processing proceeds to next processing without the log being recorded.

Subsequently, in step S122 to S130, the smart watch 1A performs the same processing as the processing in the above-described step S112 to S120 while switching the communication scheme to a communication scheme with a longer communication possible distance.

More specifically, first, in step S122, the smart watch 1A transmits a transmission signal in class 1. For example, the Bluetooth module 13 transmits a transmission signal at transmission power of ±5 dBm to +20 dBm. When the smart watch 1B is located within ten meters from the smart watch 1A, in step S124, the smart watch 1B receives the transmission signal transmitted from the smart watch 1A.

Next, in step S126, the smart watch 1B provides a response indicating that the smart watch 1B succeeds in receiving the transmission signal transmitted from the smart watch 1A. Next, in step S128, the smart watch 1A determines whether or not a response to the transmission signal transmitted in the above-described step S122 is received. When a response signal is received (S128/Yes), in step S130, the smart watch 1A records a communication result in a log.

On the other hand, when a response signal is not received (S128/No), the processing proceeds to next processing without the log being recorded.

Thereafter, the smart watch 1A repeats processing of the above-described step S102 to S130 to continuously record a log.

(Supplement)

While, in the above description, a case has been described where the smart watch 1A repeats transmission sequentially using class 3, class 2 and class 1, the technique according to the present disclosure is not limited to this. For example, when a response from a specific person is obtained, the smart watch 1A may cancel transmission of a transmission signal while switching the communication scheme to a communication scheme with a longer communication possible distance. For example, when the smart watch 1A receives a response signal from the smart watch. 1B in response to transmission in class 3, the smart watch 1A may cancel transmission in class 2 and class 1. In this case, it is possible to estimate a distance between the users while reducing power consumption by avoiding consumption of transmission power required for transmission in class 2 and class 1. In addition, when, for example, the number of responses exceeds a threshold, the smart watch 1A may cancel transmission of a transmission signal while switching the communication scheme to a communication scheme with a longer communication possible distance. This threshold can be set, for example, assuming the number of people a person can communicate with at a time.

The operation processing of the distance measurement system according to the present embodiment has been described above.

2-3. MODIFIED EXAMPLE 1

The present modified example is an example in which the smart watch 1 collects a communication result, and a server records a log and estimates human relationship. A configuration example of the server according to the present modified example will be described below with reference to FIG. 6.

Figure 6:
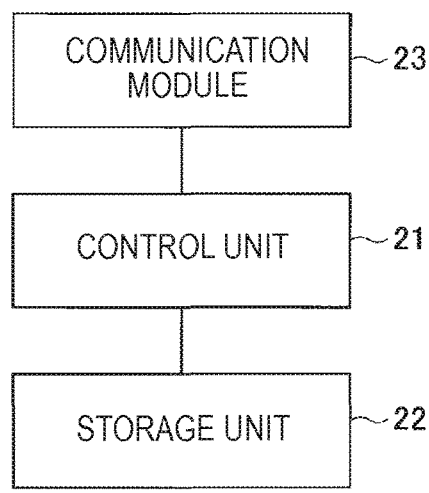
FIG. 6 is a block diagram illustrating a configuration example of a server according to modified example 1.

FIG. 6 is a block diagram illustrating a configuration example of a server 2 according to modified example 1. As illustrated in FIG. 6, the server 2 has a control unit 21, a storage unit 22 and a communication module 23.

(1) Communication Module 23

The communication module 23 is a communication module for transmitting and receiving data to and from the smart watch 1 in a wired/wireless manner. For example, the communication module 23 is directly connected with the smart watch 1 or indirectly connected with the smart watch 1 via an access point, or the like, through a phone line, a LAN, a wireless LAN, WiFi, Bluetooth, or the like.

The communication module 23 according to the present modified example receives a communication result with another smart watch 1 from the smart watch 1. The communication result is information including, for example, date and time at which communication is successful, communication scheme information indicating a communication scheme with which communication with the counterpart apparatus is successful and identification information corresponding to the counterpart apparatus.

(2) Storage Unit 22

The storage unit 22 is a portion which records and reproduces data with respect to a predetermined storage medium based on control by the control unit 21 which will be described later. The storage unit 22 is implemented as, for example, an HDD. Of course, a recording medium can include various types of recording media such as a solid-state memory such as a flash memory, a memory card which incorporates the solid-state memory, an optical disc, a magnetooptical disc, a hologram memory, or the like, and the storage unit 22 only has to employ a configuration which enables execution of recording and reproduction according to the recording medium to be employed. The storage unit 22 according to the present modified example has the same function as that of the above-described storage unit 12.

(3) Control Unit 21

The control unit 21 which functions as an arithmetic processing apparatus and a control apparatus, controls the whole operation within the server 2 according to various kinds of programs. The control unit 21 is implemented by, for example, a CPU and a microprocessor. It should be noted that the control unit 21 may include a ROM in which a program, an operation parameter, or the like, to be used is stored, and a RAM in which a parameter, or the like, which changes as appropriate is temporarily stored. The control unit 21 according to the present embodiment has a function of recording a log and a function of estimating human relationship based on a log as with the above-described control unit 11.

Specifically, the control unit 21 controls the storage unit 22 so as to store identification information and communication scheme information received through the communication module 23 in a storage medium as a log in association with each other. Because details of the function of recording a log is as described above regarding the control unit 11, the explanation will be omitted here. Further, the control unit 21 estimates relationship between the user of the smart watch 1 and a user of the counterpart apparatus based on a communication possible distance of the communication scheme indicated in the communication scheme information stored in the log in association with the identification information corresponding to the counterpart apparatus. Because details of the function of estimating human relationship based on a log is as described above regarding the control unit 11, the explanation will be omitted here.

Modified example 1 has been described above.

4. MODIFIED EXAMPLE 2

The present modified example is an example where communication standards other than Bluetooth are used as the communication scheme. The smart watch 1 according to the present modified example employs near field communication (NFC), wireless gigabit (WiGig), wireless LAN (WLAN) and Bluetooth as an example of other communication standards. A configuration example of the smart watch 1 according to the present modified example will be described below with reference to FIG. 7.

Figure 7:
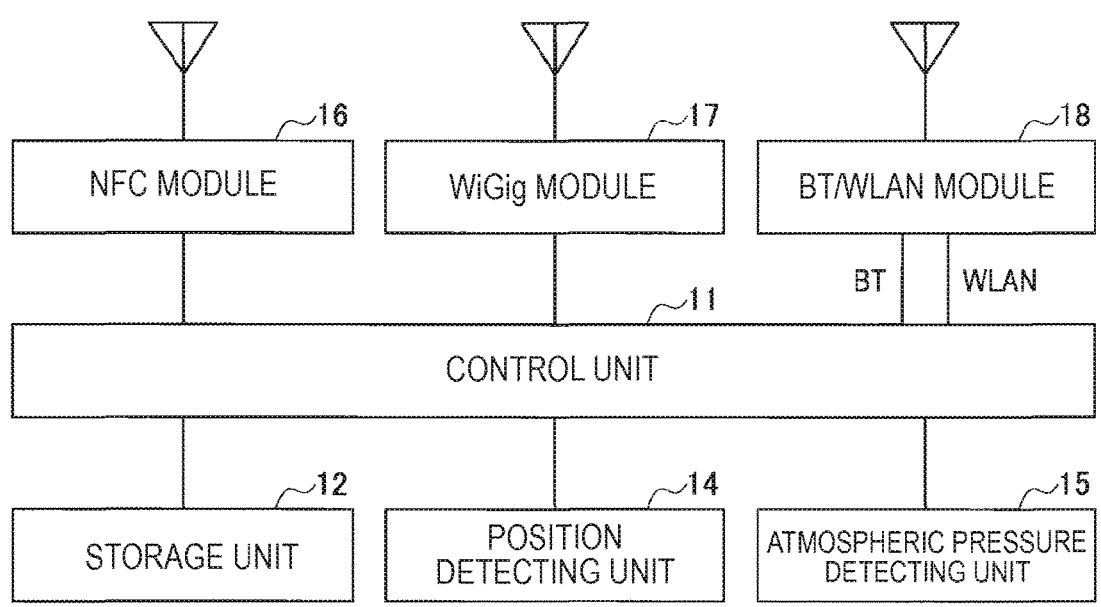
FIG. 7 is a block diagram illustrating a configuration example of a smart watch according to modified example 2.

FIG. 7 is a block diagram illustrating a configuration example of the smart watch 1 according to modified example 2. As illustrated in FIG. 7, the smart watch 1 according to the present modified example has a control unit 11, a storage unit 12, a position detecting unit 14, an atmospheric pressure detecting unit 15, an NFC module 16, a WiGif module 17 and a BT/WLAN module 18.

(1) NFC Module 16, WiGig Module 17, BT/WLAN Module 18

The NFC module 16 is a communication module for transmitting and receiving data to and from other information processing apparatuses using NFC. The WiGig module 17 is a communication module for transmitting and receiving data to and from other information processing apparatuses using WiGig. The BT/WLAN module 18 is a communication module for transmitting and receiving data to and from other information processing apparatuses using Bluetooth or WLAN. The BT/WLAN module 18 switches a communication scheme of Bluetooth or WLAN based on control by the control unit 11. The NFC module 16, the WiGig module 17 and the BT/WLAN module 18 function as a communication unit which can communicate with another smart watch 1 using a plurality of communication schemes. Here, the following Table 2 indicates a communication possible distance for each communication scheme.

TABLE 2

| Communication scheme | Communication possible distance (rough indication) |
| --- | --- |
| NFC | Up to approximately tens of centimeters |
| WiGig/Wireless HD | Up to several meters |
| Bluetooth | Up to tens of meters |
| WiFi | Up to 100 meters |
| 3 G/LTE | Up to several kilometers |
| GPS | Up to tens of thousands of kilometers |

It should be noted that a unit of the communication possible distance in Table 2 is centimeter (cm), meter (m) or kilometer (km).

The NFC module 16, the WiGig module 17 and the BT/WLAN module 18 transmit transmission signals sequentially using communication schemes with a shorter communication possible distance. Specifically, first, the NFC, secondly, WiGig, and thirdly Bluetooth are used. Of course, Wireless HD, 3G/LTE and GPS indicated in Table 2 may be used.

(2) Position Detecting Unit 14

The position detecting unit 14 has a function of detecting position information (first position information) indicating a position of the smart watch 1. For example, the position detecting unit 14 detects a position where the smart watch 1 is located by receiving a radio wave from a global positioning system (GPS) satellite. It should be noted that an example using the GPS is an example of detecting the position of the smart watch 1 based on an externally acquired signal, and the example of the position detecting unit 14 according to the present embodiment is not limited to this. For example, the position detecting unit 14 may detect the position through WiFi, transmission and reception with a mobile phone, a PHS, a smartphone, or the like, or through near field communication, or the like. The position detecting unit 14 outputs the detected position information to the control unit 11.

(3) Atmospheric Pressure Detecting Unit 15

The atmospheric pressure detecting unit 15 has a function of detecting atmospheric pressure information (first atmospheric pressure information) indicating an atmospheric pressure applied to the smart watch 1. The atmospheric pressure detecting unit 15 outputs the detected atmospheric pressure information to the control unit 11.

(4) Storage Unit 12

The storage unit 12 which has a function as described above, records and reproduces data with respect to a predetermined storage medium based on control by the control unit 11.

(5) Control Unit 11

The control unit 11 has a function of recording a log and a function of estimating human relationship based on a log as described above.

(5-1) Function of Recording Log

The control unit 11 according to the present modified example records information indicating a communication scheme with which communication is successful among NFC, WiGig, Bluetooth and WiFi in place of classes of the Bluetooth as the communication scheme information. It should be noted that the control unit 11 may sequentially n on the NFC module 16, the WiGig module 17 and the BT/WLAN module 18 and record a communication scheme with which communication is successful, or may turn on all the modules and collectively record communication schemes with which communication is successful.

Further, the control unit 11 according to the present modified example may further store the position information detected by the position detecting unit 14 and position information (second position information) indicating a position detected at the counterpart apparatus in a log in association with the identification information and the communication scheme information. Here, when the counterpart apparatus has a position detecting unit 14, the position information detected at the counterpart apparatus can be, for example, stored in a response signal and received.

Further, the control unit 11 according to the present modified example further stores the atmospheric pressure information detected by the atmospheric pressure detecting unit 15 and atmospheric pressure information (second atmospheric pressure information) indicating an atmospheric pressure detected at the counterpart apparatus in a log in association with the identification information and the communication scheme information. Here, when the counterpart apparatus has an atmospheric pressure detecting unit 15, the atmospheric pressure information detected at the counterpart apparatus can be, for example, stored in a response signal and received.

(5-2) Function of Estimating Human Relationship Based on Log

The control unit 11 estimates human relationship between users based on a communication possible distance of the communication scheme indicated in the communication scheme information recorded in the log. As indicated in Table 2, communication possible distances are different for each communication scheme. Therefore, the control unit 11 can estimate a distance between users based on a communication scheme with which communication is successful recorded in the log.

For example, when it is recorded in the log that communication using NFC, WiGig, Bluetooth and WiFi is successful, as indicated with a reference numeral 101 in FIG. 2, the control unit 11 estimates that the distance between the users is a short distance (up to tens of centimeters). Further, when it is recorded in the log that communication using WiGig, Bluetooth and WiFi is successful and communication using NFC is failed, as indicated with a reference numeral 102, the control unit 11 estimates that the distance between the users is a medium distance (up to several meters). In a similar manner, when it is recorded in the log that communication using Bluetooth (class 2) and WiFi is successful and communication using NFC and WiGig is failed, as indicated with a reference numeral 103, the control unit 11 estimates that the distance between the users is a long distance (up to ten meters). Further, when it is recorded in the log that communication using WiFi is successful, and communication using NFC, WiGig and Bluetooth is failed, as indicated with a reference numeral 104, the control unit 11 estimates that the distance between the users is a super long distance (up to 100 meters).

The control unit 11 may estimate human relationship further based on the atmospheric pressure information (the first atmospheric pressure information and the second atmospheric pressure information) stored in the log in addition to the distance between the users estimated based on the communication possible distance of the communication scheme. The atmospheric pressure changes according to altitude, for example, according to floor number in a building. Therefore, when atmospheric pressures recorded in the log are different between the smart watch 1 and the counterpart apparatus, for example, there is a case where even when the distance between the users is close, they are located in different floors, and communication is not established. In such a case, the control unit 11 can estimate that human relationship is shallow, or there is no human relationship, so that it is possible to estimate more realistic human relationship.

Further, the control unit 11 may estimate human relationship further based on position information (the first position information and the second position information) stored in the log in addition to the distance between the users estimated based on the communication possible distance of the communication scheme. The control unit 11 can estimate the distance between the users more accurately by adding the position information to the distance between the users.

3. SECOND EMBODIMENT

The present embodiment is an embodiment which enables acquisition of more accurate position information as a secondary effect of the processing of measuring a distance between users. As described in the above-described modified example 2, there is a case where the position information is added to estimation of the distance between the users. In this case, by acquiring more accurate position information, accuracy of estimation of the distance between the users is improved, which can result in improving accuracy of estimation of human relationship. Outline of the position estimation processing according to the present embodiment will be described below with reference to FIG. 8 and FIG. 9. It should be noted that the smart watch 1 according to the present embodiment has the position detecting unit 14 and the atmospheric pressure detecting unit 15 described with reference to FIG. 7 in addition to the same components as the components of the smart watch 1 according to the first embodiment described with reference to FIG. 3.

3-1. OUTLINE

Figure 8:
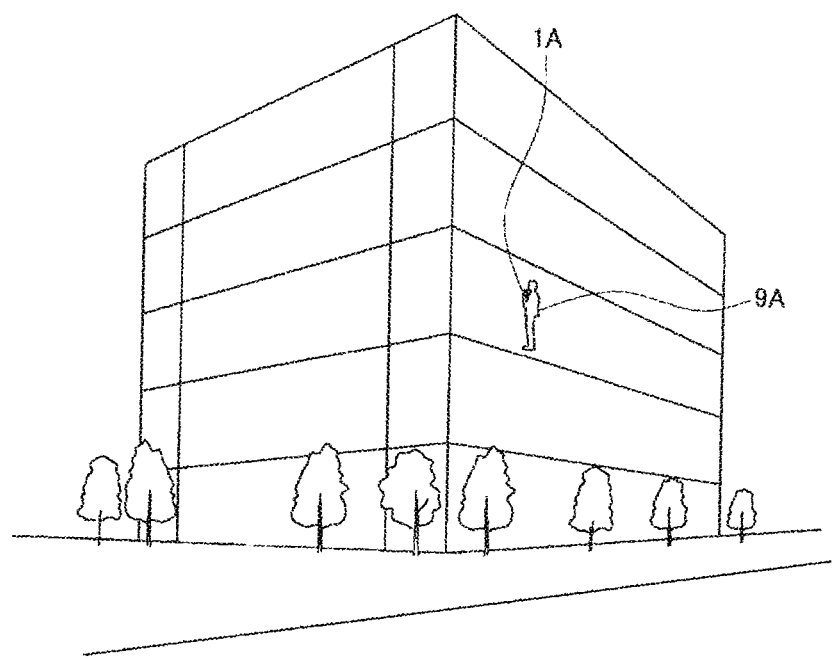
FIG. 8 is an explanatory diagram for explaining position estimation processing according to a second embodiment.
Figure 9:
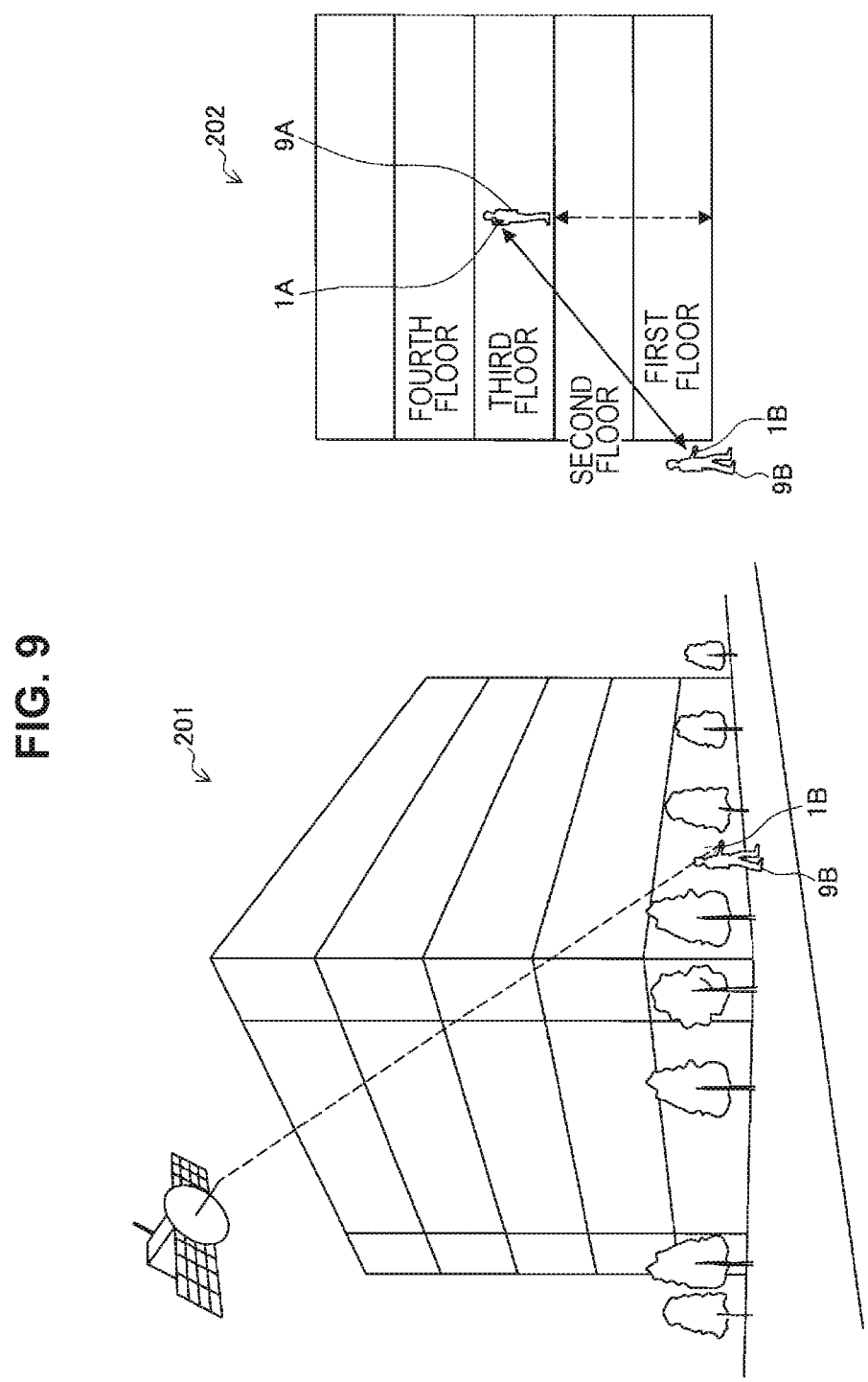
FIG. 9 is an explanatory diagram for explaining the position estimation processing according to the second embodiment.

FIG. 8 and FIG. 9 are explanatory diagrams for explaining the position estimation processing according to the second embodiment. As illustrated in FIG. 8 and FIG. 9, an example is assumed where the user 9A is located within a building. Typically, because GPS accuracy is lowered inside a building and underground, it is difficult to acquire accurate position information using GPS. Meanwhile, as indicated with a reference numeral 201 in FIG. 9, it is possible to acquire accurate position information using GPS accuracy outdoors. Therefore, as indicated with a reference numeral 202 in FIG. 9, the smart watch 1 according to the present embodiment acquires more accurate position information using position information of the counterpart apparatus located outdoors and information of a distance from the counterpart apparatus.

For example, as illustrated in FIG. 9, an example is assumed where the smart watch 1A located in the third floor of the building performs position estimation processing. In this case, the smart watch 1A estimates the position of the smart watch 1A based on position information acquired by the smart watch 1B worn by the user B located outdoors and information of a distance from the smart watch 1B. More specifically, the smart watch 1A estimates that a position in a distance indicated in the information of the distance from the position of the smart watch 1B is the position of the smart watch 1A.

Further, as illustrated in FIG. 9, when the user 9A is located in the second floor or higher of the building, it is difficult to detect a position in a height direction only using GPS information. In this case, even when the information of the distance from the counterpart apparatus is known, because a possible range of the position of the smart watch 1A is different according to the floor number, it can be difficult to acquire accurate position information. Therefore, as indicated with a reference numeral 202 in FIG. 9, the smart watch 1A estimates altitude (floor number) of the smart watch 1A based on the atmospheric pressure information detected by the atmospheric pressure detecting unit 15 and estimates position information further based on the altitude. By this means, the smart watch 1A can estimate position information with higher accuracy. It should be noted that when the smart watch 1B has an atmospheric pressure detecting unit 15, the smart watch 1A can estimate position information with higher accuracy by further using the atmospheric pressure information of the smart watch 1B.

While an example has been described using FIG. 9 where the smart watch 1 estimates a position using relationship with one counterpart apparatus located outdoors, the smart watch 1 may estimate the position using relationship with a plurality of counterpart apparatuses located outdoors. In this case, because a possible range of the position of the smart watch 1 is narrowed down using a plurality of pieces of position information and a plurality of pieces of distance information, estimation accuracy is improved. In this manner, even when the smart watch 1 is located within a building or underground, the smart watch 1 can obtain position information with higher accuracy by being based on distance information obtained from n-to-n relationship compared to by being based on distance information obtained from one-to-one relationship.

Further, the smart watch 1 may be a counterpart apparatus located indoors and may perform position estimation processing using relationship with the counterpart apparatus for which position information is estimated with high accuracy through the above-described position estimation processing. For example, in the example illustrated in FIG. 9, an example is assumed where the user 9C who wears the smart watch 1C is located at the fourth floor. In this case, the smart watch 1C first requests the smart watch 1A to estimate position information with high accuracy through the above-described position estimation processing. The smart watch 1C then estimates the positon of the smart watch 1C based on the position information of the smart watch 1A and the information of the distance from the smart watch 1A. In this manner, the smart watch 1 can estimate the position of the smart watch 1 by making the counterpart apparatus located indoors estimate the position in a chain reaction.

Further, the smart watch 1 may estimate the position of the smart watch 1 further using the position information acquired using GPS, or the like. As described above, there is a case where the position information acquired using GPS is not accurate indoors. Even in such a case, the smart watch 1 may, for example, narrow down the position using the position information of the counterpart apparatus and the information of the distance from the counterpart apparatus after specifying a rough position with reference to the acquired position information.

The outline of the position estimation processing according to the present embodiment has been described above. Subsequently, the operation processing of the distance measurement system according to the present embodiment will be described with reference to FIG. 10 and FIG. 11.

3-2. Operation Processing

Figure 10:
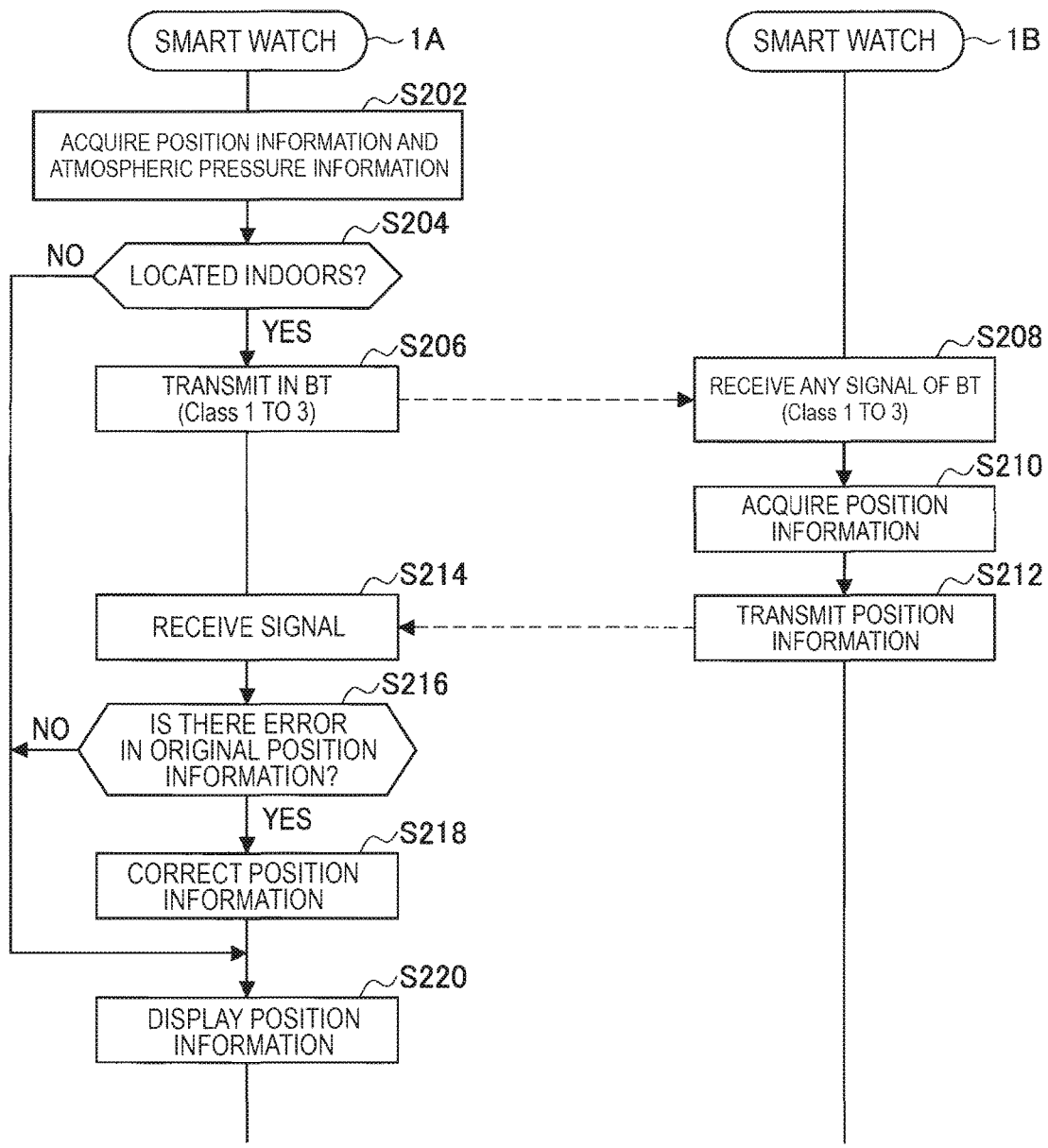
FIG. 10 is a sequence diagram illustrating an example of flow of position estimation processing executed in a distance measurement system according to the second embodiment.

FIG. 10 is a sequence diagram illustrating an example of flow of position estimation processing executed in the distance measurement system according to the present embodiment. The smart watch 1A and the smart watch 1B are involved with the sequence illustrated in FIG. 10. Here, it is assumed that it is determined that the smart watch 1B is located outdoors, for example, from the atmospheric pressure information and the position information. It should be noted that while, in the following description, one smart watch 1B is involved as an example of the counterpart apparatus, a plurality of counterpart apparatuses may be involved.

As illustrated in FIG. 10, first, in step S202, the smart watch 1A acquires the position information and the atmospheric pressure information. More specifically, the position detecting unit 14 detects the position information, and the atmospheric pressure detecting unit 15 detects the atmospheric pressure information.

Subsequently, in step S204, the smart watch 1A determines whether or not the smart watch 1A is located indoors. For example, the control unit 11 determines whether or not the smart watch 1A is located indoors by checking the position information detected by the position detecting unit 14 against map information of the surrounding area. In addition, when one position is not specified from the position information detected by the position detecting unit 14 and the position information is not converged, the control unit 11 may determine that the smart watch 1A is located indoors. Further, when a difference between the altitude indicated by the atmospheric pressure information detected by the atmospheric pressure detecting unit 15 and elevation is equal to or greater than a threshold, the control unit 11 may determine that the smart watch 1A is located indoors (on the second floor or higher or in the first basement or lower). It should be noted that when it is determined that the smart watch 1A is located indoors (S204/No), the processing proceeds to step S220 which will be described later.

When it is deter mined that the smart watch 1A is located indoors (S204/Yes), in step S206, the smart watch 1A transmits a transmission signal sequentially using Bluetooth of class 3, class 2 and class 1. When the smart watch 1B succeeds in receiving a transmission signal using any of these in step S208, the smart watch 1B provides a response indicating that the smart watch 1B succeeds in receiving the transmission signal transmitted from the smart watch 1A in step S212. Because this series of processing is as described above with reference to FIG. 5, detailed description will be omitted here. In this series of processing, in step S210, the smart watch 1B acquires the position information of the smart watch 1B. The control unit 11 of the smart watch 1B then stores the position information of the smart watch 1B detected by the position detecting unit 14 of the smart watch 1B in a response signal to be transmitted in step S212.

Next, in step S214, the smart watch 1A receives the response signal transmitted by the smart watch 1B. As described above in the first embodiment, the control unit 11 can estimate a distance between the smart watch 1A and the smart watch 1B based on a class used for transmission to which a response is received. Further, the control unit 11 can acquire the position information of the smart watch 1B from the received response signal.

Then, in step S216, the smart watch 1A determines whether or not there is an error in original position information acquired in step S202. More specifically, first, the control unit 11 estimates a distance from the smart watch 1B based on the response signal received in step S214 and acquires the position information of the smart watch 1B. Then, the control unit 11 estimates a position in a distance indicated in the distance information from the position of the smart watch 1B indicated in the position information as the position of the smart watch 1A. At this time, the control unit 11 may estimate the position further using the altitude (floor number) of the smart watch 1A indicated in the atmospheric pressure information acquired in step S202. The control unit 11 then determines whether or not the position indicated in the original position information acquired in step S202 matches the estimated position or whether or not an error falls within a predetermined range. It should be noted that when it is determined that there is no error in the original position information (S216/No), the processing proceeds to step S220 which will be described later.

When it is determined that there is an error in the original position information (S216/Yes), in step S218, the smart watch 1A corrects the position information. For example, the control unit 11 deletes the original position information acquired in the above-described step S202 and rewrites the position information with the position information indicating the position estimated in the above-described step S216.

Next, in step S220, the control unit 11 displays the position information of the smart watch 1A at a display unit which is not illustrated. The position information displayed at this time is position information corrected in the above-described step S218 when the smart watch 1A is located indoors and when there is an error in the original position information, and is position information acquired in the above-described step S202 in other cases.

An example of flow of the position estimation processing executed in the distance measurement system according to the present embodiment has been described above. While, in the above description, an example has been described where the smart watch 1A mainly performs the position estimation processing, the position estimation processing can be executed mainly by the server 2. Therefore, operation processing in the case where the server 2 mainly executes the position estimation processing will be described with reference to FIG. 11. It should be noted that a configuration of the server 2 is as described above with reference to FIG. 6.

Figure 11:
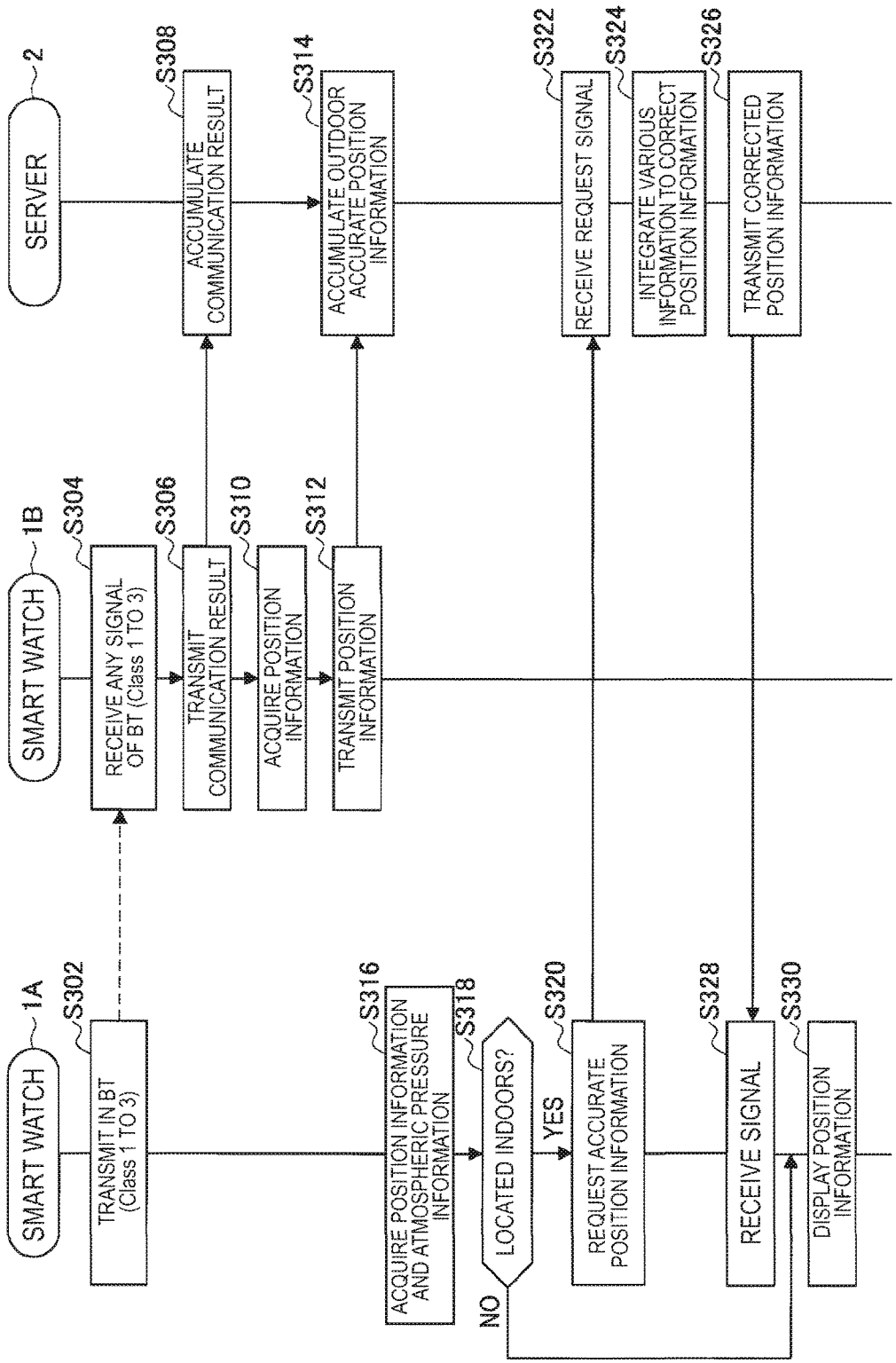
FIG. 11 is a sequence diagram illustrating an example of flow of position estimation processing executed in the distance measurement system according to the second embodiment.

FIG. 11 is a sequence diagram illustrating an example of flow of the position estimation processing executed in the distance measurement system according to the present embodiment. The smart watch 1A, the smart watch 1B and the server 2 are involved with the sequence illustrated in FIG. 11. Here, it is assumed that it is determined that the smart watch 1B is located outdoors, for example, from the atmospheric pressure information and the position information. It should be noted that while, in the following description, one smart watch 1B is involved as an example of the counterpart apparatus, a plurality of counterpart apparatuses may be involved.

As illustrated in FIG. 11, first, in step S302, the smart watch 1A transmits a transmission signal sequentially using Bluetooth of class 3, class 2 and class 1. When the smart watch 1B succeeds in receiving a transmission signal using any of these in step S304, in step S306 the smart watch 1B transmits a communication result to the server 2. The communication result here is information including date and time at which communication is successful in step S304, communication scheme information indicating a communication scheme with which communication with the smart watch 1A is successful and identification information corresponding to the smart watch 1A. Next, in step S308, the server 2 accumulates a communication result received from the smart watch 1B as a log.

Next, the smart watch 1B located outdoors acquires accurate position information in step S310 and transmits the acquired position information to the server 2 in step S312. Next, in step S314, the server 2 accumulates accurate position information acquired from the smart watch 1B as a log.

The processing described above is repeatedly performed, and a log is accumulated in the server 2. When the smart watch 1A acquires the position information, the following processing is executed.

First, in step S316, the smart watch 1A acquires position information and atmospheric pressure information. Then, in step S318, the smart watch 1A determines whether or not the smart watch 1A is located indoors. When it is determined that the smart watch 1A is located outdoors (S318/No), the processing proceeds to step S330 which will be described later.

When it is determined that the smart watch 1A is located indoors (S318/Yes), in step S320, the smart watch 1A transmits a request for acquiring accurate position information to the server 2. In this request signal, for example, the position information and the atmospheric pressure information acquired in step S318 can be stored.

Next, in step S322, the server 2 receives the request signal transmitted from the smart watch 1A. Then, in step S324, the server 2 integrates various kinds of information including the communication result accumulated in the above-described step S308, the position information in the above-described step S314, the position information acquired in the above-described step S316 and the atmospheric pressure information to correct the position information of the smart watch 1A. Because the processing by the control unit 21 here is as described in the above-described step S216 and S218 described with reference to FIG. 10, detailed description will be omitted here.

Next, in step S326, the server 2 transmits the corrected position information to the smart watch 1A, and, in step S328, the smart watch 1A receives this.

Next, in step S339, the smart watch 1A displays the position information. The position information displayed at this time is position information corrected in the above-described step S324 in the case where the smart watch 1A is located indoors, or position information acquired in the above-described step S316 in the case where the smart watch 1A is located outdoors.

The operation processing of the distance measurement system according to the present embodiment has been described above.

4. CONCLUSION

As described above, the smart watch 1 according to an embodiment of the present disclosure can acquire information useful for estimation of realistic human relationship. Specifically, the smart watch 1 can record a communication scheme with which communication is successful as a log.

According to the first embodiment and modified examples 1 and 2, by utilizing a change of a class by transmission power control of Bluetooth and a difference in communication possible distances by a change of the communication standards, it is possible to estimate a distance between humans. Further, the smart watch 1 can estimate human relationship between humans and generate a social graph using the log in which a distance from the counterpart apparatus is recorded.

Further, according to the second embodiment, by combining the distance estimation processing with the technique of estimating a position using GPS, it possible to perform position estimation with high accuracy even in an environment where it is difficult to estimate a position using GPS.

Figure 12:
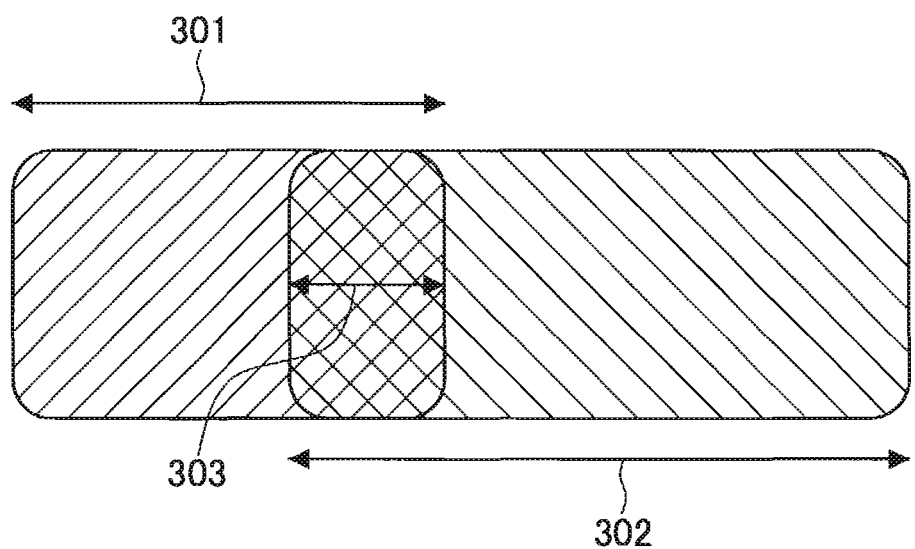
FIG. 12 is an explanatory diagram for explaining an example of effects of distance estimation processing according to an embodiment of the present disclosure.

Further, as illustrated in FIG. 12, the smart watch 1 can also acquire distance information with higher accuracy by combining the distance estimation technique according to the present embodiment with another distance measurement technique. It should be noted that FIG. 12 is an explanatory diagram for explaining an example of effects of the distance estimation processing according to an embodiment of the present disclosure. A reference numeral 301 indicated in FIG. 12 indicates a range estimated by the distance estimation technique according to the present embodiment as a distance from the counterpart apparatus. A reference numeral 302 indicates a range estimated by another distance measurement technique as a distance from the counterpart apparatus. In this manner, with any of the techniques, there is a case where the distance is not specified as a unique value and estimated as a value within a certain range. In such a case, by combining these techniques, a range of a distance from the counterpart apparatus is specified as a reference numeral 303 which is a range where ranges estimated by the both techniques overlap with each other. In this manner, the smart watch 1 can acquire distance information with higher accuracy by combining the distance estimation technique according to the present embodiment with another distance measurement technique compared to a case where any one of the techniques is used.

It should be noted that a series of control processing by each apparatus described in the present specification may be realized using software, hardware and any combination of software and hardware. A program constituting the software is stored in advance in a storage medium (non-transitory medium) provided inside or outside of each apparatus. Each program is, for example, loaded to a RAM when executed, and executed by a processor such as a CPU.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:

a communication unit configured to be able to communicate with another information processing apparatus by using a plurality of communication schemes; and a control unit configured to, when communication with the another information processing apparatus is successful, store in a storage medium a log in which identification information corresponding to the another information processing apparatus acquired from the another information processing apparatus through the communication unit and communication scheme information indicating a communication scheme with which the communication is successful are associated with each other.

(2)

The information processing apparatus according to (1), wherein success of the communication indicates that a response indicating that a transmission signal transmitted through the communication unit s successfully received is received through the communication unit from the another information processing apparatus.

(3)

The information processing apparatus according to (2), wherein the communication unit transmits the transmission signal by sequentially using a communication scheme with a shorter communication possible distance.

(4)

The information processing apparatus according to any one of (1) to (3), wherein the plurality of communication schemes include respective classes of Bluetooth®.

(5)

The information processing apparatus according to any one of (1) to (3), wherein the plurality of communication schemes include Bluetooth® and other communication standards.

(6)

The information processing apparatus according to any one of (1) to (5), wherein the information processing apparatus includes the storage medium.

(7)

The information processing apparatus according to any one of (1) to (5), wherein an external apparatus capable of performing communication includes the storage medium.

(8)

The information processing apparatus according to any one of (1) to (7), wherein the control unit estimates relationship between a user of the information processing apparatus and a user of the another information processing apparatus based on a communication possible distance of a communication scheme indicated in the communication scheme information stored in the log in association with the identification information corresponding to the another information processing apparatus.

(9)

The information processing apparatus according to (8), further including:

an atmospheric pressure detecting unit configured to detect first atmospheric pressure information indicating an atmospheric pressure, wherein the communication unit receives from another information processing apparatus, second atmospheric pressure information indicating an atmospheric pressure detected by the another information processing apparatus, and wherein the control unit stores the first atmospheric pressure information detected by the atmospheric pressure detecting unit and the second atmospheric pressure information received through the communication unit in the log further in association with the identification information and the communication scheme information.

(10)

The information processing apparatus according to (9), wherein the control unit estimates the relationship further based on the first atmospheric pressure information and the second atmospheric pressure information stored in the log.

(11)

The information processing apparatus according to any one of (1) to (10), further including:

a position detecting unit configured to detect first position information indicating a position of the information processing apparatus, wherein, when it is determined that the information processing apparatus is located indoors, the control unit acquires second position information indicating a position of the another information processing apparatus from the another information processing apparatus through the communication unit, and corrects the first position information detected by the position detecting unit based on the second position information acquired from the another information processing apparatus determined to be located outdoors, and a communication possible distance of a communication scheme with which communication with the another information processing apparatus is successful.

(12)

The information processing apparatus according to (11), further including:

an atmospheric pressure detecting unit configured to detect first atmospheric pressure information indicating an atmospheric pressure, wherein the control unit corrects e first position information further based on the first atmospheric pressure information detected by the atmospheric pressure detecting unit.

(13)

An information processing apparatus including:

a communication unit configured to receive from a client apparatus capable of communicating with another client apparatus by using a plurality of communication schemes, identification information corresponding to the another client apparatus which succeeds in communication and communication scheme information indicating a communication scheme with which the communication is successful; and a control unit configured to store in a storage medium a log in which the identification information and the communication scheme information received through the communication unit are associated with each other, (14)

The information processing apparatus according to (13), wherein the control unit estimates relationship between a user of the client apparatus and a user of the another client apparatus based on a communication possible distance of a communication scheme indicated in the communication scheme information stored in the log in association with the identification information corresponding to the another client apparatus.

(15)

The information processing apparatus according to (13) or (14), wherein the communication unit receives first position information indicating a position of the client apparatus from the client apparatus and receives second position information indicating a position of the another client apparatus from the another client apparatus, and wherein the control unit corrects the first position information received through the communication unit based on the second position information received through the communication unit from the another information processing apparatus determined to be located outdoors and a communication possible distance of a communication scheme with which the client apparatus succeeds in communication with the another client apparatus.

(16)

A storage medium storing a program for making a computer function as an information processing apparatus including:

a communication unit configured to be able to communicate with another information processing apparatus by using a plurality of communication schemes; and a control unit configured to, when communication with the another information processing apparatus is successful, store in a storage medium a log in which identification information corresponding to the another information processing apparatus acquired from the another information processing apparatus through the communication unit and communication scheme information indicating a communication scheme with which the communication is successful are associated with each other.

(17)

An information processing method including:

receiving from a client apparatus capable of communicating with another client apparatus by using a plurality of communication schemes, identification information corresponding to the another client apparatus which succeeds in communication and communication scheme information indicating a communication scheme with which the communication is successful; and storing in a storage medium a log in which the received identification information and communication scheme information are associated with each other.

REFERENCE SIGNS LIST 1 smart watch
11 control unit
12 storage unit
13 Bluetooth module
14 position detecting unit
15 atmospheric pressure detecting unit
16 NFC module
17 WiGig module
18 BT/WLAN module 18
2 server
21 control unit
22 storage unit
23 communication module
9 user

The invention claimed is:

1. An information processing apparatus comprising:
circuitry configured to
communicate with another information processing apparatus by using a plurality of communication schemes;
when communication with the another information processing apparatus is successful, store in a storage medium a log in which identification information corresponding to the another information processing apparatus acquired from the another information processing apparatus through the circuitry and communication scheme information indicating a communication scheme with which the communication is successful are associated with each other, and estimate a relationship between a user of the information processing apparatus and a user of the another information processing apparatus based on a communication possible distance of a communication scheme indicated in the communication scheme information stored in the log in association with the identification information corresponding to the another information processing apparatus; and an atmospheric pressure detector configured to detect first atmospheric pressure information indicating an atmospheric pressure, wherein the circuitry receives from another information processing apparatus, second atmospheric pressure information indicating an atmospheric pressure detected by the another information processing apparatus, and wherein the circuitry stores the first atmospheric pressure information detected by the atmospheric pressure detector and the second atmospheric pressure information received through the circuitry in the log further in association with the identification information and the communication scheme information.

2. The information processing apparatus according to claim 1,
wherein success of the communication indicates that a response indicating that a transmission signal transmitted through the communication unit is successfully received is received through the circuitry from the another information processing apparatus.

3. The information processing apparatus according to claim 2,
wherein the circuitry transmits the transmission signal by sequentially using a communication scheme with a shorter communication possible distance.

4. The information processing apparatus according to claim 1,
wherein the plurality of communication schemes include respective classes of Bluetooth®.

5. The information processing apparatus according to claim 1,
wherein the plurality of communication schemes include Bluetooth® and other communication standards.

6. The information processing apparatus according to claim 1,
wherein the information processing apparatus includes the storage medium.

7. The information processing apparatus according to claim 1,
wherein an external apparatus capable of performing communication includes the storage medium.

8. The information processing apparatus according to claim 1,
wherein the circuitry estimates the relationship further based on the first atmospheric pressure information and the second atmospheric pressure information stored in the log.

9. An information processing apparatus comprising:
circuitry configured to communicate with another information processing apparatus by using a plurality of communication schemes; and
when communication with the another information processing apparatus is successful, store in a storage medium a log in which identification information corresponding to the another information processing apparatus acquired from the another information processing apparatus through the circuitry and communication scheme information indicating a communication scheme with which the communication is successful are associated with each other wherein the circuitry is further configured to estimate a relationship between a user of the information processing apparatus and a user of the another information processing apparatus based on a communication possible distance of a communication scheme indicated in the communication scheme information stored in the log in association with the identification information corresponding to the another information processing apparatus and an atmospheric pressure detector configured to detect first atmospheric pressure information indicating an atmospheric pressure, wherein the circuitry receives from another information processing apparatus, second atmospheric pressure information indicating an atmospheric pressure detected by the another information processing apparatus, and wherein the circuitry stores the first atmospheric pressure information detected by the atmospheric pressure detector and the second atmospheric pressure information received through the circuitry in the log further in association with the identification information and the communication scheme information; and a position detector configured to detect first position information indicating a position of the information processing apparatus, wherein, when it is determined that the information processing apparatus is located indoors, the circuitry
  acquires second position information indicating a position of the another information processing apparatus from the another information processing apparatus through the circuitry, and
  corrects the first position information detected by the position detector based on the second position information acquired from the another information processing apparatus determined to be located outdoors, and a communication possible distance of a communication scheme with which communication with the another information processing apparatus is successful.

10. The information processing apparatus according to claim 9, further comprising:
  an atmospheric pressure detector configured to detect first atmospheric pressure information indicating an atmospheric pressure,
  wherein the circuitry corrects the first position information further based on the first atmospheric pressure information detected by the atmospheric pressure detector.

11. An information processing apparatus comprising:
  circuitry configured to receive from a client apparatus capable of communicating with another client apparatus by using a plurality of communication schemes, identification information corresponding to the another client apparatus which succeeds in communication and communication scheme information indicating a communication scheme with which the communication is successful; and
  store in a storage medium a log in which the identification information and the communication scheme information received through the communication unit are associated with each other
  wherein the circuitry receives first position information indicating a position of the client apparatus from the client apparatus and receives second position information indicating a position of the another client apparatus from the another client apparatus, and
  wherein the circuitry corrects the first position information received through the circuitry based on the second position information received through the circuitry from the another information processing apparatus determined to be located outdoors and a communication possible distance of a communication scheme with which the client apparatus succeeds in communication with the another client apparatus.

12. The information processing apparatus according to claim 11, wherein the control unit estimates relationship between a user of the client apparatus and a user of the another client apparatus based on a communication possible distance of a communication scheme indicated in the communication scheme information stored in the log in association with the identification information corresponding to the another client apparatus.

13. An information processing method comprising:
  receiving from a client apparatus capable of communicating with another client apparatus by using a plurality of communication schemes, identification information corresponding to the another client apparatus which succeeds in communication and communication scheme information indicating a communication scheme with which the communication is successful; and
  storing in a storage medium a log in which the received identification information and communication scheme information are associated with each other
  receiving with circuitry first position information indicating a position of the client apparatus from the client apparatus and receives second position information indicating a position of the another client apparatus from the another client apparatus, and
  correcting the first position information received through the circuitry based on the second position information received through the circuitry from the another information processing apparatus determined to be located outdoors and a communication possible distance of a communication scheme with which the client apparatus succeeds in communication with the another client apparatus.

* * * * *